(12) United States Patent
Puntigam et al.

(10) Patent No.: US 11,691,327 B2
(45) Date of Patent: Jul. 4, 2023

(54) METHOD OF MAKING A HALF SHELL

(71) Applicant: MAGNA Energy Storage Systems GesmbH, Sinabelkirchen (AT)

(72) Inventors: David Puntigam, Gross St.Florian (AT); Mario Drebes, Sengentha (DE); Andreas Preitler, Gratkorn (AT); Rainer Puchleitner, Graz (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 211 days.

(21) Appl. No.: 17/173,776

(22) Filed: Feb. 11, 2021

(65) Prior Publication Data

US 2021/0260812 A1    Aug. 26, 2021

(30) Foreign Application Priority Data

Feb. 20, 2020    (EP) .................................... 20158507

(51) Int. Cl.
*B29C 51/12*    (2006.01)
*B29C 51/10*    (2006.01)
(Continued)

(52) U.S. Cl.
CPC .............. *B29C 51/12* (2013.01); *B29C 51/10* (2013.01); *B29C 51/14* (2013.01); *B29C 51/266* (2013.01);
(Continued)

(58) Field of Classification Search
CPC ...... B29L 2031/7172; B29K 2023/086; B29K 2023/065; B32B 27/32; B32B 27/306;
(Continued)

(56) References Cited

U.S. PATENT DOCUMENTS

2004/0173618 A1    9/2004   Suzuki et al.
2012/0205337 A1*   8/2012   Holbach ................. F17C 13/06
                                                 215/40

FOREIGN PATENT DOCUMENTS

WO         2018225413 A1     12/2018
WO     WO-2018225413 A1 *    12/2018   ............. B29C 49/18

OTHER PUBLICATIONS

Office Action, China National Intellectual Property Administration (dated Aug. 19, 2022).

* cited by examiner

*Primary Examiner* — Vishal I Patel
(74) *Attorney, Agent, or Firm* — Jordan IP Law, LLC; Todd A. Vaughn

(57) ABSTRACT

A method for producing a half-shell that includes an insert member for a high-pressure vessel using a mould having a first mould section forming a female mould. The method includes laying a pre-heated first plastic sheet on the first mould section; pressing or adhering, via one or more of a partial vacuum or a pressure, the first plastic sheet onto the first mould section; positioning the plastic of the first plastic sheet in areas behind a back-taper of the insert member at a lateral distance from the insert member, or positioning the insert member, after the pressing or adhering, so that plastic of the first plastic sheet is disposed in areas behind a back-taper of the insert member at a lateral distance from the insert member; and pressing or adhering, via a slide, partial vacuum, or pressure, the plastic of the first plastic sheet behind the back-taper and laterally distanced from the insert member, onto the insert member so that a space behind the back-taper of the insert member is filled with the plastic.

19 Claims, 3 Drawing Sheets

(51) Int. Cl.
  *B29C 51/14* (2006.01)
  *B29C 51/26* (2006.01)
  *B32B 27/08* (2006.01)
  *B32B 27/30* (2006.01)
  *B32B 27/32* (2006.01)
  *B29K 23/00* (2006.01)
  *B29L 31/00* (2006.01)

(52) U.S. Cl.
  CPC ............ *B32B 27/08* (2013.01); *B32B 27/306* (2013.01); *B32B 27/32* (2013.01); *B29K 2023/065* (2013.01); *B29K 2023/086* (2013.01); *B29L 2031/7172* (2013.01)

(58) Field of Classification Search
  CPC ....... B32B 27/08; B29C 51/266; B29C 51/14; B29C 51/10; B29C 51/12
  See application file for complete search history.

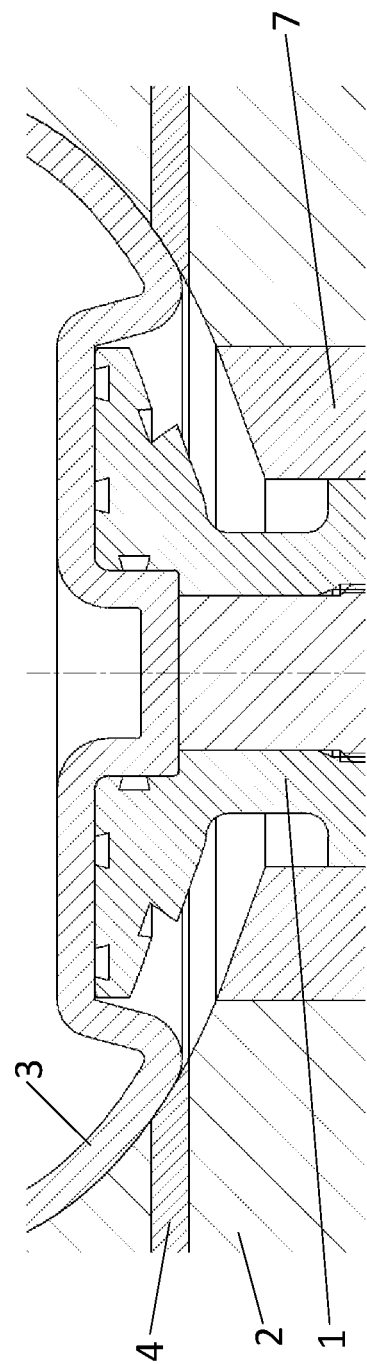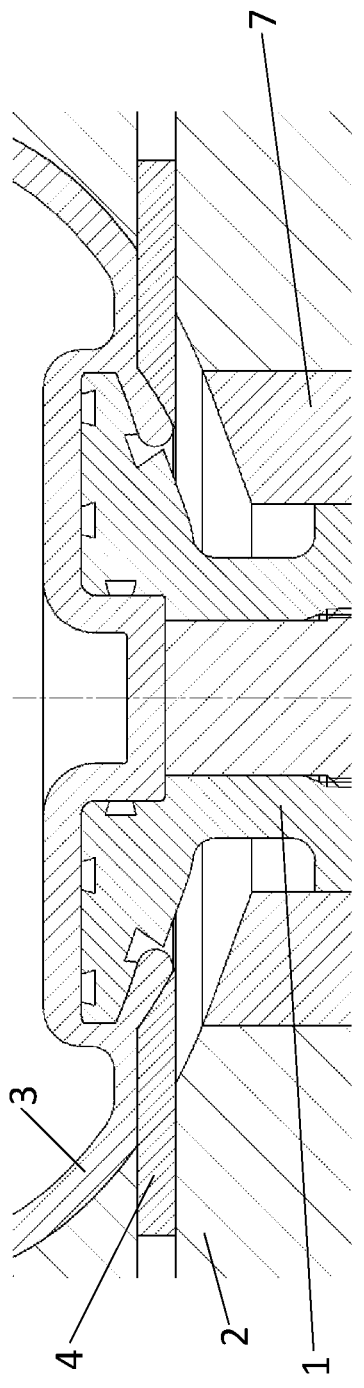

METHOD OF MAKING A HALF SHELL

CROSS-REFERENCE TO RELATED APPLICATIONS

The present application claims priority 35 U.S.C. § 119 to European Patent Publication No. EP 20158507.2 (filed on Feb. 20, 2020), which is hereby incorporated by reference in its entirety.

TECHNICAL FIELD

One or more embodiments relate to a method for producing a half-shell for a high-pressure vessel, and a method for producing a high-pressure vessel.

BACKGROUND

It is known that high-pressure vessels, for the storage of hydrogen as fuel for motor vehicles, for example, can be constructed from an inner layer, the so-called "liner", and a winding of fibre material around the liner.

The use of blow-moulding and thermoforming technologies for producing a vessel is already known. Production then relies on shaping semifinished products in tubular or sheet form. These are brought into their final form through a partial vacuum and/or high pressure. For example, two half-shells may be produced, which are joined to one another to form a vessel.

For applied use in producing gas-tight liners for type IV vessels used to store gases under pressure there are two common methods of production: firstly the blow-moulding of whole liners, and secondly the method of producing segments of the vessel by injection-moulding and extrusion processes, and subsequently connecting these components through a joining process.

The materials used for this are for the most part based on high-density polyethylene (HDPE) or polyamides.

Important distinguishing features for liner materials are the mechanical low-temperature characteristics and the emissions characteristics. Monolayer materials such as polyamide have a good barrier property for gases, but less than ideal low-temperature characteristics. HDPE on the other hand does not have a suitable barrier effect but possesses very good low-temperature characteristics.

For this reason, at present polyamide is mainly used, especially for applications involving hydrogen. However, this imposes limits on the size of components, particularly in the case of blow-moulding technology. The suitable types available are moreover costly, owing to the expensive additives used, and problematical in low-temperature use.

High-pressure vessels for gases are subjected to large temperature fluctuations in operational service (filling, storage and drainage). This places high demands on the materials and especially on the liner.

In conjunction with the lightweight construction and the use of composite materials, the challenge presenting itself in this context is to form a gas-tight connection between the different materials at the site of the joint.

SUMMARY

An object of the invention is to improve the production of high-pressure vessels in this respect and in particular to specify a method for producing a half-shell for a high-pressure vessel and a method for producing a high-pressure vessel which is easy and cost-effective to perform and which makes it possible to fulfil the leak-tightness and permeation requirements for a high-pressure vessel.

The object is achieved by a method for producing a half-shell for a high-pressure vessel, in which the half-shell comprises an insert member, and in which a mould is used having a first mould section which forms a female mould, comprising the following steps:

laying a pre-heated first plastic sheet on the first mould section;

pressing or adhering, via one or more of a partial vacuum or a pressure, the first plastic sheet onto the first mould section;

positioning the plastic of the first plastic sheet in areas behind a back-taper of the insert member at a lateral distance from the insert member, or positioning the insert member, after the pressing or adhering, so that plastic of the first plastic sheet is disposed in areas behind a back-taper of the insert member at a lateral distance from the insert member;

pressing or adhering, via a partial vacuum or a pressure, the plastic of the first plastic sheet behind the back-taper and laterally distanced from the insert member, onto the insert member so that a space behind the back-taper of the insert member is filled with the plastic.

In accordance with one or more embodiments, an insert member, preferably of metal or plastic, more preferably a so-called boss part of a high-pressure vessel, is embedded tightly into a plastic by filling a back-taper of the insert member with the plastic of the half-shell in an additional step to the shaping of the half-shell.

For this purpose an insert member, in particular a boss part, is insert membered into the mould and in a blow-moulding or deep-drawing process is encased with the plastic sheet, in particular a permeation-tight multilayer composite, so that the plastic also gets into areas behind a back-taper. To do this is a plastic sheet is first sucked via a partial vacuum or pressed via a pressure onto the first mould section. In so doing the insert member may already be so positioned that by sucking or pressing the plastic onto the first mould section the plastic of the first plastic sheet is disposed in areas behind a back-taper of the insert member, at a lateral distance from the insert member.

Alternatively, the insert member may be positioned only after sucking or pressing the plastic onto the first mould section, so that plastic of the first plastic sheet is disposed behind the back-taper at a lateral distance from the insert member, for example by displacing the insert member or only now introducing the insert member into the first mould section.

Via a slide or a partial vacuum or a pressure, the plastic of the first plastic sheet is then pressed or sucked from its lateral position relative to the insert member onto the insert member, so that a space behind the back-taper of the insert member is filled with the plastic previously situated laterally thereof, producing a positive interlock.

The plastic, despite the ease of production via blow-moulding or vacuum-forming, also gets into areas behind the insert member, resulting in an improved sealing effect of the plastic, in particular of the multilayer composite, in relation to the insert member, in particular the metal boss part. In order to achieve the inclusion in the plastic, a slide and/or a vacuum or compressed air are used.

As disclosed herein, "at a lateral distance" is to mean at a substantial distance from a longitudinal centre axis of the insert member, which may preferably also coincide with the longitudinal centre axis of pressure vessel. The plastic may first run substantially parallel to the longitudinal centre axis of the insert member member and preferably also to the surrounding vessel wall. The plastic is then sucked, blown or pushed substantially perpendicular to the longitudinal centre axis of the insert member member, in particular radially inwards on all sides, towards the insert member member.

The sucking or pressing of the plastic onto the insert member member after the positioning of the insert member member, so that the plastic is disposed in areas at a lateral distance from the insert member member, can also be performed in one continuous process, so that each time the insert member member is moved further and positioned, and in the process more new plastic is each time sucked in or pressed, so that the positioning of the insert member member and the sucking or pressing of the plastic behind the back-taper virtually occurs simultaneously.

In a further step of the process, the resulting half-shell can be connected to a second half-shell or an extruded or blow-moulded multilayer cylinder. This forms the core and therefore the basis for a further winding process, in which the vessel can acquire its mechanical strength through a composite material composed of carbon and/or glass and epoxy resin.

Embodiments are therefore capable of combining advantages of the injection moulding technology with regard to the production of a positively interlocking connection of metal insert member members, in particular boss parts, to the plastic liner, with the advantages of blow-moulding or deep-drawing technology affording the facility for using multilayer materials.

The mould preferably comprises a second mould section, which forms a male mould, the second mould section being run onto the first mould section in order to form the internal contour of the half-shell. The second mould section may at the same time shape the form of the first plastic sheet inside the half-shell. Instead of this, the second mould section may also be loaded with a second plastic sheet, which forms the internal contour of the half-shell.

After sucking or pressing the first plastic sheet onto the first mould section, the insert member member is preferably raised in relation to the first mould section, in order to position the insert member member so that plastic of the first plastic sheet is disposed behind the back-taper at a lateral distance from the insert member. Raising can be performed with the aid of a moveable mounting for the insert member. The insert member may in this case be disposed externally on the first plastic sheet and the raising can therefore be performed along the longitudinal centre axis of the insert member and preferably also along the longitudinal centre axis of the high-pressure vessel, in particular in the direction towards the subsequent centre of the vessel.

After filling the space behind the back-taper of the insert member with the plastic the insert member is preferably lowered again in relation to the first mould section. The lowering is more preferably performed simultaneously with traversing of the second mould section onto the first mould section.

In accordance with one or more embodiments, the insert member is laid on the first plastic sheet only after sucking or pressing the first plastic sheet onto the first mould section, in order to position the insert member in such a way that plastic of the first plastic sheet is disposed behind the back-taper at a lateral distance from the insert member. The insert member can therefore be disposed internally on the first plastic sheet. A second plastic sheet can in turn be disposed on the internal side of the insert member.

The plastic of the first plastic sheet can be cut off axially behind the plastic-filled space behind the back-taper, so that no plastic remains behind the back-taper, in particular on the external side of the back-taper.

A pre-heated second plastic sheet is preferably laid on the second mould section, following which the second plastic sheet is sucked via a partial vacuum or pressed via a pressure onto the second mould section, and the second mould section with the second plastic sheet is run onto the first mould section, in order to form the internal contour of the half-shell.

The first plastic sheet is preferably a multilayer composite, the multilayer preferably comprising a layer of high-density polyethylene (HDPE) and a barrier layer, in particular ethylene-vinyl alcohol copolymer) (EVOH). The multilayer composite more preferably also comprises a regrind material or regranulate and/or one or more primer layers. HDPE preferably forms the outermost layer of the multilayer composite and may additionally also form the innermost layer.

In accordance with one or more embodiments, a method for producing a high-pressure vessel consists in producing a half-shell by a method as described above, in which the half-shell is connected to a further half-shell, which may likewise comprise an insert member, for example, and which may be produced in the same manner previously described, or to at least one, preferably extruded or blow-moulded, cylinder and an end cap, in order to form a closed vessel.

The closed vessel is preferably wrapped with a fibre material, preferably with a composite material comprising carbon fibres and/or glass fibres and/or epoxy resin.

Developments of the invention are specified in the dependent claims, the description and the drawings attached.

DRAWINGS

One or more embodiments will be illustrated by way of example in the drawings and explained in the description hereinbelow.

FIG. 7 illustrates a detailed representation of FIG. 3 in the area around the back-taper of the insert member.

FIG. 8 illustrates a detailed representation of FIG. 4 in the area around the back-taper of the insert member.

DESCRIPTION

Figure 1:
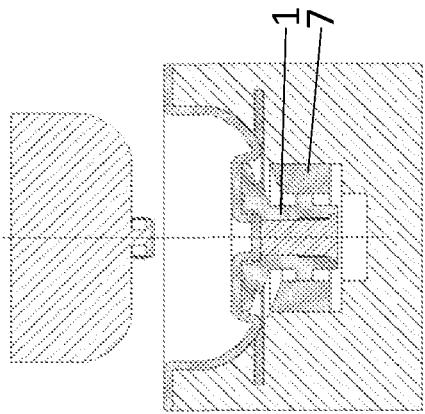
FIGS. 1 through 6 illustrate sectional views of a method for producing a half-shell, in a first embodiment.
Figure 2:
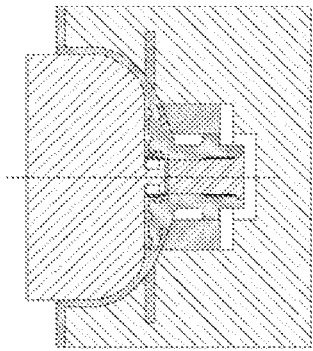

The illustrated embodiment of FIGS. 1 through 6 represent a method for producing a half-shell for a high-pressure vessel.

A mould is used having a first mould section 2, which forms a female mould, and a second mould section 5, which forms a male mould. The mould therefore comprises two mould sections, the insert member 1 being positioned on a moveable mounting 7 in the first mould section 2, preferably the lower mould section. The second mould section 5, preferably the upper mould section, functions as male mould, in order to apply a mould pressure at the end of the process. In addition, the second mould section 5 may also be loaded with a second insert member. Via slides 4 provided in the mould and/or a vacuum, plastic to form the half shell is delivered to the locations needed for the positive interlock.

Figure 3:
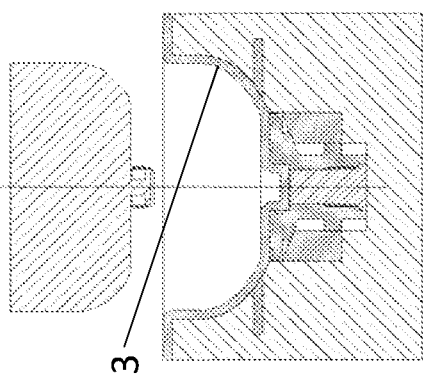

For this purpose, a pre-heated first plastic sheet 3 is laid on the first mould section 2 and the first plastic sheet 3 is sucked via a partial vacuum or pressed via a pressure onto the first mould section 2. Then the insert member 1 is positioned so that plastic of the first plastic sheet 3 is disposed in areas behind a back-taper, at a lateral distance from the insert member 1. Alternatively, it is also possible to dispense with the traversing of the insert member 1, so that the plastic is sucked straight onto a correctly positioned insert member 1, as illustrated in FIG. 3.

Then via a slide 4 or a partial vacuum or a pressure, the plastic of the first plastic sheet 3 behind the back-taper and laterally distanced from the insert member 1 is then pressed or sucked onto the insert member 1, so that a space behind the back-taper of the insert member 1 is filled with the plastic.

Finally, the second mould section 5 is run onto the first mould section 2, in order to form the internal contour of the half-shell.

The single-sheet method represented in FIGS. 1 through 6 in particular comprises the following steps:

As illustrated in FIG. 1, in the first step of the single-sheet method, the one mould section (that is the first mould section 2) is loaded with the insert member 1 (i.e., that is a boss part) and a pre-heated plastic sheet 3. The insert member 1 is situated in an initial position. At this point the second mould section 5 may optionally also be loaded with a further insert member. Via a vacuum or partial vacuum, the plastic sheet 3 is sucked into the first mould section 2, which reproduces the external component geometry.

Figure 4:
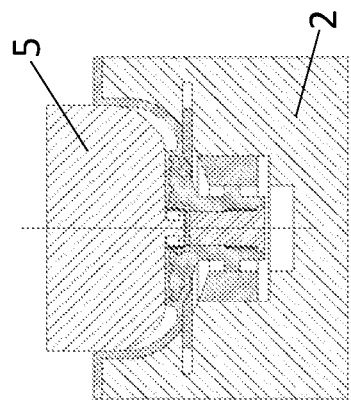

In order to fill the space behind the back-taper of the insert member 1 needed for the positive interlock with plastic, the insert member 1 is positioned in the first mould section 2 on a moveable mounting 7. As illustrated in FIGS. 3 and 4, the space behind the back-taper of the component is filled by raising the component with the simultaneous use of a vacuum and/or slides 4, for example.

Figure 5:
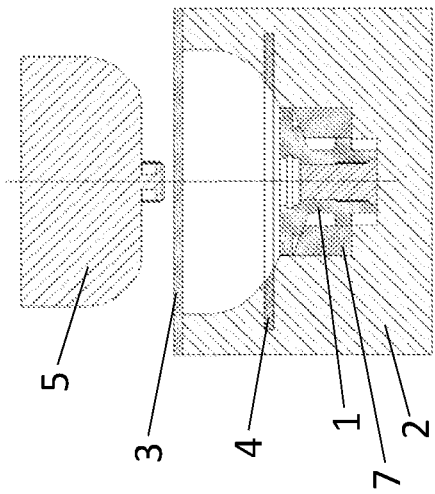
Figure 6:
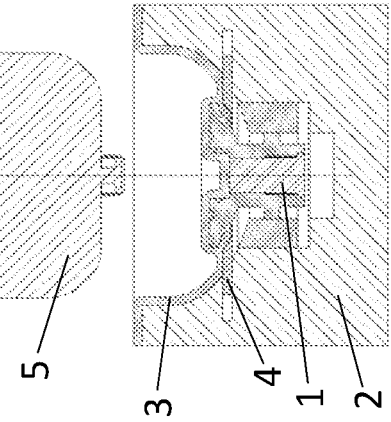

As illustrated in FIG. 5, in the next step the second mould section 5 is lowered with a defined closing force onto the first mould section 2 and the internal contour of the component reproduced. In the course of this step in the process, the insert member 1 may possibly be brought back into the initial position. The plastic behind the back-tapers is thereby additionally moulded and the positive interlock between the insert member 1 and the plastic of the first plastic sheet 3 is increased.

The illustrated embodiment of FIGS. 9 through 14 represent an alternative embodiment of the production method, namely a twin-sheet method for producing the half-shell.

Figure 9:
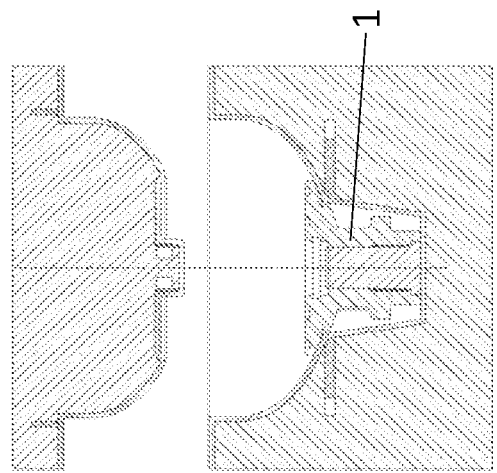
FIGS. 9 through 14 illustrates sectional views of a method for producing a half-shell, in a second embodiment.

As illustrated in FIG. 9, in a first step of the twin-sheet method, both mould sections 2, 5 are each loaded with a pre-heated plastic sheet 3, 6. At this point, the second mould section 5 may also be optionally loaded with an insert member.

Figure 10:
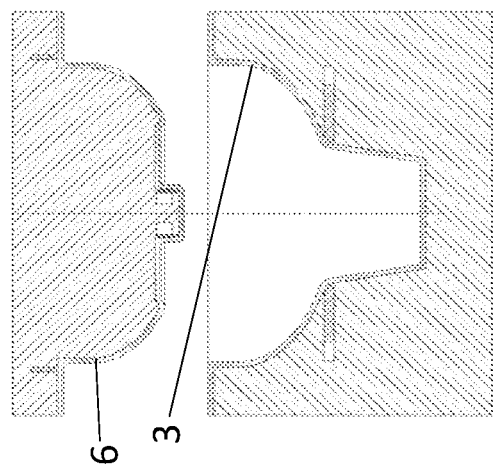

As illustrated in FIG. 10, via a vacuum, the plastic sheets 3, 6 are sucked into or onto the respective mould sections 2, 5, which reproduce the external and internal component geometry.

Figure 11:
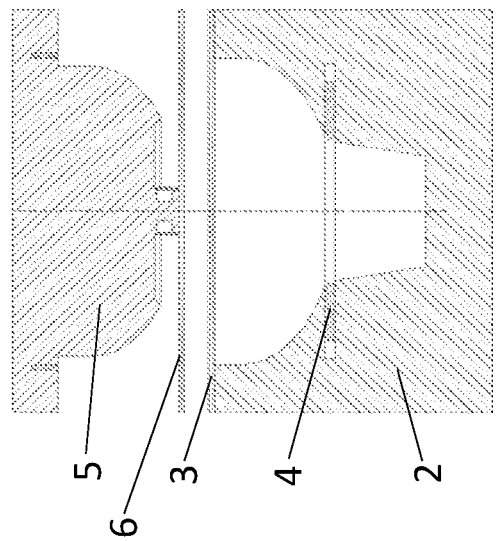

As illustrated in FIG. 11, in the next step, the insert member 1 to be encased is insert membered into the first mould section 2.

Figure 12:
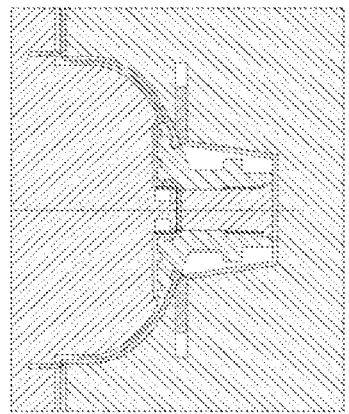

As illustrated in FIG. 12, via a vacuum and/or slides 4, the space behind the back-taper of the insert member 1 needed for the positive interlock is filled with plastic.

Figure 13:
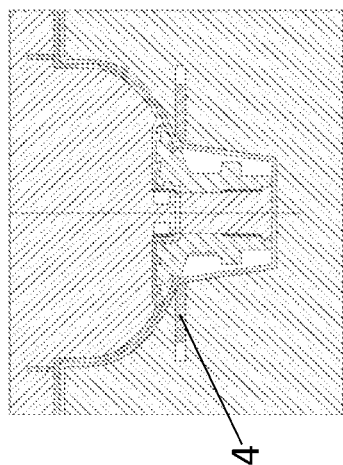

As illustrated in FIG. 13, the excess material is detached by knife edges introduced into the mould behind the back-taper. These knife edges may, as in FIG. 13, also be incorporated in the slides 4.

Figure 14:
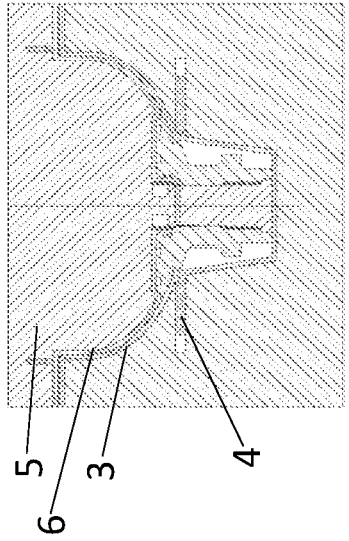

As illustrated in FIG. 14, the finished component, in which the excess plastic is detached below the back-taper and the slide 4.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS 1 insert member
2 first mould section
3 first plastic sheet
4 slide
5 second mould section
6 second plastic sheet
7 mounting

What is claimed is:

1. A method for producing a half-shell comprising an insert member for a high-pressure vessel using a mould having a first mould section forming a female mould, the method comprising:
   laying a pre-heated first plastic sheet on the first mould section;
   pressing or adhering, via one or more of a partial vacuum or a pressure, the first plastic sheet onto the first mould section;
   positioning the plastic of the first plastic sheet in areas behind a back-taper of the insert member at a lateral distance from the insert member, or positioning the insert member, after the pressing or adhering, so that plastic of the first plastic sheet is disposed in areas behind the back-taper of the insert member at the lateral distance from the insert member; and
   pressing or adhering, via a slide, partial vacuum, or pressure, the plastic of the first plastic sheet behind the back-taper and laterally distanced from the insert member, onto the insert member so that a space behind the back-taper of the insert member is filled with the plastic, wherein the mould comprises a second mould section forming a male mould, and the second mould section is run onto the first mould section, in order to form an internal contour of the half-shell.

2. The method of claim 1, further comprising, after pressing or adhering the first plastic sheet onto the first mould section, filling the back-taper of the insert member with the plastic of the first plastic sheet by raising the insert member in relation to the first mould section in order to position the insert member so that the plastic of the first plastic sheet is disposed behind the back-taper at a lateral distance from the insert member.

3. The method of claim 2, further comprising, after filling the back-taper of the insert member with the plastic, lowering the insert member in relation to the first mould section.

4. The method of claim 1, further comprising, after pressing or adhering the first plastic sheet onto the first mould section, laying the insert member on the first plastic sheet in order to position the insert member so that plastic of the first plastic sheet is disposed behind the back-taper at the lateral distance from the insert member.

5. The method of claim 4, wherein plastic of the first plastic sheet is cut off axially behind the plastic-filled space behind the back-taper.

6. The method of claim 1, wherein the first plastic sheet is a multilayer composite.

7. The method of claim 6, wherein the multilayer composite comprises a layer of HDPE and a barrier layer comprising EVOH.

8. The method of claim 1, further comprising:
   laying a pre-heated second plastic sheet on the second mould section;
   pressing or adhering, via one or more of a partial vacuum or a pressure, the second plastic sheet onto the second mould section; and
   running the second mould section with the second plastic sheet onto the first mould section to form an internal contour of the half-shell.

9. A method for producing a high-pressure vessel, the method comprising:
   producing a half-shell by the method of claim 1; and
   forming a closed vessel by connecting the half-shell to one or more of another half-shell, at least one cylinder, and an end cap.

10. The method of claim 9, further comprising encapsulating the closed vessel with a fibre material.

11. The method of claim 10, wherein the fibre material is a composite material comprising one or more of carbon fibres, glass fibres, and epoxy resin.

12. A method for producing a half-shell, the method comprising:
   laying a pre-heated first plastic sheet on a first mould section forming a female mould of a mould;
   pressing or adhering the first plastic sheet onto the first mould section;
   positioning the plastic of the first plastic sheet in areas behind a back-taper of an insert member at a lateral distance from the insert member, or positioning the insert member, after the pressing or adhering, so that plastic of the first plastic sheet is disposed in areas behind the back-taper of the insert member at the lateral distance from the insert member;
   pressing or adhering the plastic of the first plastic sheet behind the back-taper of the insert member and laterally distanced from the insert member, onto the insert member so that a space behind the back-taper of the insert member is filled with the plastic; and
   running a second mould section, forming a male mould of the mould, onto the first mould section to form an internal contour of the half-shell.

13. The method of claim 12, further comprising, after pressing or adhering the first plastic sheet onto the first mould section, filling the back-taper of the insert member with the plastic of the first plastic sheet by raising the insert member in relation to the first mould section in order to position the insert member so that the plastic of the first plastic sheet is disposed behind the back-taper at the lateral distance from the insert member.

14. The method of claim 13, further comprising, after filling the back-taper of the insert member with the plastic, lowering the insert member in relation to the first mould section.

15. The method of claim 12, further comprising, after pressing or adhering the first plastic sheet onto the first mould section, laying the insert member on the first plastic sheet in order to position the insert member so that plastic of the first plastic sheet is disposed behind the back-taper at a lateral distance from the insert member.

16. The method of claim 15, wherein plastic of the first plastic sheet is cut off axially behind the plastic-filled space behind the back-taper.

17. The method of claim 12, wherein the first plastic sheet is a multilayer composite.

18. The method of claim 17, wherein the multilayer composite comprises a layer of HDPE and a barrier layer comprising EVOH.

19. The method of claim 12, further comprising:
   laying a pre-heated second plastic sheet on the second mould section;
   pressing or adhering, via one or more of a partial vacuum or a pressure, the second plastic sheet onto the second mould section; and
   running the second mould section with the second plastic sheet onto the first mould section to form an internal contour of the half-shell.

\* \* \* \* \*